United States Patent
Goodwin et al.

(10) Patent No.: US 8,640,037 B2
(45) Date of Patent: Jan. 28, 2014

(54) GRAPHICAL OVERLAY RELATED TO DATA MINING AND ANALYTICS

(75) Inventors: Joshua C. Goodwin, Mountain View, CA (US); Joshua R. Manion, Los Altos, CA (US); William M. Latimer, San Jose, CA (US)

(73) Assignee: Ensighten, LLC, Cupertino, CA (US)

( * ) Notice: Subject to any disclaimer, the term of this patent is extended or adjusted under 35 U.S.C. 154(b) by 0 days.

(21) Appl. No.: 13/433,609

(22) Filed: Mar. 29, 2012

(65) Prior Publication Data
US 2013/0263023 A1   Oct. 3, 2013

Related U.S. Application Data

(60) Provisional application No. 61/601,375, filed on Feb. 21, 2012.

(51) Int. Cl.
*G06F 3/048*   (2013.01)

(52) U.S. Cl.
USPC ........................................................ 715/760

(58) Field of Classification Search
USPC ........................................................ 715/760
See application file for complete search history.

(56) References Cited

U.S. PATENT DOCUMENTS

| | | | |
|---|---|---|---|
| 6,487,604 B1 | 11/2002 | Rochford et al. | |
| 6,633,312 B1 | 10/2003 | Rochford et al. | |
| 6,654,803 B1 | 11/2003 | Rochford et al. | |
| 6,691,282 B1 | 2/2004 | Rochford et al. | |
| 7,389,343 B2 | 6/2008 | Busch et al. | |
| 7,584,435 B2 | 9/2009 | Bailey et al. | |
| 7,814,424 B2* | 10/2010 | Shilo .............................. 715/744 | |
| 7,885,942 B2 | 2/2011 | Chand et al. | |
| 7,890,451 B2 | 2/2011 | Cancel et al. | |
| 7,941,394 B2 | 5/2011 | Error | |
| 2003/0097421 A1 | 5/2003 | Wille et al. | |
| 2003/0154442 A1 | 8/2003 | Papierniak | |
| 2007/0011304 A1 | 1/2007 | Error | |
| 2007/0112856 A1 | 5/2007 | Schram et al. | |

(Continued)

FOREIGN PATENT DOCUMENTS

| | | |
|---|---|---|
| EP | 1105790 | 6/2001 |
| EP | 1105790 A1 | 6/2001 |

(Continued)

OTHER PUBLICATIONS

Peterson, Eric T., "The Coming Revolution in Web Analytics," copyright 2009, pp. 1-18, SAS Institute Inc.

(Continued)

*Primary Examiner* — Omar Abdul-Ali
*Assistant Examiner* — Haimei Jiang
(74) *Attorney, Agent, or Firm* — Banner & Witcoff, Ltd.

(57) ABSTRACT

Methods, computer-readable media, and apparatuses provide a graphical overlay for displaying analytic data over at least a portion of a corresponding page. A graphical overlay may be displayed over at least a portion of a page displayed on a graphical user interface according to page data. Data may be inputted into the graphical overlay and analytic data corresponding to the displayed page may be received from a remote server. Also, the graphical overlay may display at least a portion of the analytic data based on the inputted data. The graphical overlay may be built to run as an add-on to a browser or non-browser application or to run as a separate application.

28 Claims, 9 Drawing Sheets

(56) References Cited

U.S. PATENT DOCUMENTS

| | | | |
|---|---|---|---|
| 2007/0288247 A1 | 12/2007 | Mackay | |
| 2007/0299743 A1 | 12/2007 | Staib et al. | |
| 2007/0299964 A1 | 12/2007 | Wong et al. | |
| 2008/0040473 A1 | 2/2008 | Larsson et al. | |
| 2008/0052278 A1 | 2/2008 | Zlotin et al. | |
| 2008/0086454 A1 | 4/2008 | Bahadori et al. | |
| 2008/0183806 A1 | 7/2008 | Cancel et al. | |
| 2008/0183858 A1 | 7/2008 | Error | |
| 2008/0184116 A1 | 7/2008 | Error | |
| 2008/0189281 A1 | 8/2008 | Cancel et al. | |
| 2008/0201242 A1 | 8/2008 | Minnis et al. | |
| 2008/0201643 A1 | 8/2008 | Nagaitis et al. | |
| 2008/0228819 A1 | 9/2008 | Minnis et al. | |
| 2008/0270471 A1 | 10/2008 | Schon | |
| 2009/0024748 A1 | 1/2009 | Goldspink et al. | |
| 2009/0100139 A1 | 4/2009 | Purdy et al. | |
| 2009/0100154 A1 | 4/2009 | Stevenson et al. | |
| 2009/0112918 A1 | 4/2009 | Terrell | |
| 2009/0182718 A1 | 7/2009 | Waclawik et al. | |
| 2009/0204478 A1 | 8/2009 | Kaib et al. | |
| 2009/0248497 A1 | 10/2009 | Hueter et al. | |
| 2009/0287713 A1* | 11/2009 | Anderson et al. | 707/10 |
| 2009/0292677 A1* | 11/2009 | Kim | 707/3 |
| 2009/0300174 A1* | 12/2009 | Floris et al. | 709/224 |
| 2009/0327353 A1 | 12/2009 | Zhuge et al. | |
| 2010/0017384 A1 | 1/2010 | Marinescu | |
| 2010/0030894 A1* | 2/2010 | Cancel et al. | 709/224 |
| 2010/0049627 A1* | 2/2010 | Geppert et al. | 705/27 |
| 2010/0231790 A1* | 9/2010 | Ansari et al. | 348/552 |
| 2010/0235494 A1 | 9/2010 | Sood et al. | |
| 2010/0251128 A1* | 9/2010 | Cordasco | 715/736 |
| 2010/0281389 A1 | 11/2010 | Hutchinson | |
| 2010/0318976 A1* | 12/2010 | Everly et al. | 717/141 |
| 2010/0332962 A1* | 12/2010 | Hammer et al. | 715/205 |
| 2011/0035486 A1 | 2/2011 | Seolas et al. | |
| 2013/0031506 A1* | 1/2013 | Diaz et al. | 715/781 |

FOREIGN PATENT DOCUMENTS

| | | |
|---|---|---|
| EP | 1108309 | 6/2001 |
| EP | 1108309 A1 | 6/2001 |
| EP | 1108312 | 6/2001 |
| EP | 1108312 A1 | 6/2001 |
| EP | 1145167 | 10/2001 |
| EP | 1145167 A2 | 10/2001 |
| EP | 1264261 | 11/2005 |
| EP | 1264261 B1 | 11/2005 |
| EP | 1997041 | 12/2008 |
| EP | 1997041 A1 | 12/2008 |
| EP | 1094635 | 8/2009 |
| EP | 1094635 B1 | 8/2009 |
| EP | 2141614 | 1/2010 |
| EP | 2199969 | 6/2010 |
| GB | 2412805 A | 10/2005 |
| WO | 0079374 | 12/2000 |
| WO | 0079374 A1 | 12/2000 |
| WO | 0103374 | 1/2001 |
| WO | 0103374 A1 | 1/2001 |
| WO | 0103378 | 1/2001 |
| WO | 0103378 A1 | 1/2001 |
| WO | 0103023 | 8/2001 |
| WO | 0103023 A3 | 8/2001 |
| WO | 2007107702 | 9/2007 |
| WO | 2008024706 | 2/2008 |
| WO | 2008137522 | 11/2008 |
| WO | 2010119379 | 10/2010 |
| WO | 2011084843 | 7/2011 |

OTHER PUBLICATIONS

Manion, Josh, "Data Collection Part 1-Single Methodologies," retrieved Nov. 6, 2009, pp. 1-3, Stratigent, LLC.

Resig, John. Website: www.ejohn.org retrieved Feb. 18, 2010.

Website: www.tealium.com, retrieved Jan. 26, 2010.

Website: www.monetate.com, retrieved Feb. 22, 2010.

Website: www.speed-trap.com, retrieved Jan. 26, 2010.

Website: www.tagman.corn, retrieved Jan. 26, 2010.

Website: www.sitetagger.co.uk, retrieved Jan. 26, 2010.

Crockford, Douglas, "The JavaScript Minifier," Dec. 4, 2003, pp. 1-2, website: http://www.crockford.com/javascript/jsmin.html.

Crockford, Douglas, "PHP Adaptation of JSMin" JSMIN_lib.pho (for PHP 4, 5), retrieved on Jan. 26, 2010, pp. 1-10, website: http://javascript.crockford.com/jsmin2.php.txt.

Website: http://developer.yahoo.com/yui/, on Feb. 18, 2010, pp. 1-2.

Website: www.dojotoolkit.org, retrieved Feb. 22, 2010, p. 1.

Website: http://download.dojotoolkit.org/release-1.4.0/dojo.js.uncompressed.js, retrieved Feb. 22, 2010.

Website: www.code.google.com/p/jqueryjs/downloads/detail?name=jquery-1.3.2.js, retrieved Jan. 26, 2010.

Website: www.jquery.com, retrieved Jan. 26, 2010, pp. 1-2.

Website: www.magiq.com, retrieved Feb. 22, 2010, pp. 1.

International Search Report & Written Opinion from PCT Application No. PCT/US10/61997, mailed Mar. 3, 2011.

Chenghsien Yu, et al. "A Study of Using Automatic Text Indexing to Analyze Web Browsing Behavior" Proceedings of the 5" World Congress on Intelligent Control and Automations, Jun. 15-19, 2004, Hangzhou, P.R. China.

Yong Tan, et al. "Analysis of a least recently used cache management policy for web browsers" Operations Research, v. 50, n. 2, p. 345-57, Jan. 1999.

Christian von der Weth, et al., "COBS: Realizing Decentralized Infrastructure for Collaborative Browsing and Search", 2011 Internationl Conference on Advanced Information Networking and Applications, (AINA 2011), p. 617-24, 2011, Mar. 22-25, 2011.

Hui Chen, et al., "Business-to-Consumer Mobile Agent—Based Internet Commerce System (MAGICS)", IEEE Transactions on Systems, Man, and Cybernetics—Part C: Applications and Reviews, vol. 37, No. 6, pp. 1174-1189, Nov. 1, 2007.

W. Ulam, et al. "Technical considerations in remote LIMS access via the World Wide Web", J Autom, Methods Manag. Chem. (UK); v 2005, n 4, pp. 217-222, Dec. 11, 2005.

Victor Pascual—Cid, "An Information Visualisation System for the Understand of Web Data", VAST'08—IEEE Symposium on Visual Analytics Science and Technology, Proceedings, p. 183-184, Oct. 21, 2008.

Alison Lee, et al. "Browsers to Support Awareness and Social Interaction", IEEE Computer Graphics and Applications v 24, n 5, p. 66-75, Sep. 1, 2004.

Wikipedia, the free encyclopedia webpage http://en.wikipedia.org/wiki/List_of_HTTP_header_fields#Requests, Aug. 11, 2011, 7 pp. Wikimedia Foundation, Inc.

Overriding a JavaScript function while referencing the original, http://stackoverflow.com/questions/296667/overriding-a-javascript-function-while-referencing-the . . . , pp. 1-3, downloaded Dec. 28, 2010.

The Wall Street Journal, Your Apps Are Watching You, Scott Thurm et al., dated Dec. 17, 2010, http://topics.wsj.com/article/SB10001424052748704694004576020083703574602.html, pp. 1-7, downloaded Dec. 28, 2010.

The Wall Street Journal, Watchdog Planned for Online Privacy, Julia Angwin, dated Nov. 11, 2010, http://online.wsj.com/article/SB10001424052748703848204515608970171176014.html, pp. 1-3, downloaded Dec. 28, 2010.

Google Analytics without javacript!, http://www.vdgraaf.info/google-analytics-without-javascript.html, pp. 1-10, Posted Feb. 28, 2007, downloaded Dec. 24, 2010.

How to add event handler with Prototype new Element() constructor?, http://stackoverflow.com/questions/278927/how-to-ad-event-handler-with-prototype-new-element . . . , pp. 1-3, downloaded Dec. 28, 2010.

Dive Into Greasemonkey, 4.22. Overriding a built-in-Javascript method, http://diveintogreasemonkey.org/patterns/override-method/html, pp. 1-2. downloaded Dec. 28, 2010.

Adding elements to the DOM, http://www.javascriptkit.com/javalutors/dom2.shtml, pp. 1-3, downloaded Dec. 28, 2010.

* cited by examiner

GRAPHICAL OVERLAY RELATED TO DATA MINING AND ANALYTICS

This application claims priority to U.S. Provisional Application Ser. No. 61/601,375 filed Feb. 21, 2012, which is herein incorporated by reference in its entirety.

TECHNICAL FIELD OF ART

Aspects of the disclosure generally relate to a graphical overlay related to data mining and analytics.

BACKGROUND

Data mining is a field in which data about users is collected and analyzed for a variety of purposes. Data mining may be performed to collect/analyze, for example, Internet data such as web analytics. Web analytics may be obtained when a population of users visits a web page and/or starts an application that causes certain program instructions to be executed. Usually, data is collected for web analytics purposes through a variety of mechanisms, including the setting of a cookie and/or by running scripts in the HTML document. The scripts may perform a variety of functions, including grabbing variables from the document object model (DOM) and/or sending back an image request to a data collection server either internally or externally hosted.

The program instructions for web analytics are generally authored and run by a variety of vendors, including Omniture™, Google™, Yahoo™, and Webtrends™, among others, in order to be able to capture data such as web page load times, "mouse overs" (i.e., moving a mouse over a particular object on the web page), and the page requestor's IP address. Meanwhile, web pages are generally written in Hypertext Markup Language (HTML). They are written using HTML elements that include "tags" surrounded by angle brackets. Information in the tag may tell the web browser how to interpret the HTML element (e.g., as text, for insertion of an image into the webpage, for running a script, etc.). These tags can, among other things, include or can load scripts in languages such as JavaScript™. A medium complexity web page may include 5-10 tags with a reference to scripting code stored on servers managed by different vendors.

When a marketer associated with an organization decides that she wants to change the code to measure and analyze different features, the process is often tedious and challenging. In many situations, to perform this update, the marketer must create a new custom variable in the program instructions, define what the new variable is, and specify what data the modified code must capture for the web page. Since the marketer might not be skilled in how to perform these modifications, she must interface with her information technology (IT) department or other similar agency. Sometimes, even the IT department may not adequately understand the syntax of the web analytics program instructions to properly modify the code, especially given that the myriad web analytics vendors, advertisers, survey researchers, and marketers all have their own custom computer code for effectuating the collection of data for analysis. In other situations, the IT department may not have the appropriate bandwidth to modify the code for deployment on schedule (e.g., for an advertisement campaign deadline, etc.). These problems are only exacerbated when a client's website has many pages and/or many different types of program instructions for collecting various data about a web page visitor.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer readable media, and apparatuses for providing a graphical overlay for data mining and managing analytic data.

In some aspects of the disclosure, a graphical overlay may be displayed over at least a portion of a page displayed on a graphical user interface according to page data. The graphical overlay may receive inputted data, such as event information indicating a specific type of analytic data to be collected. The event information may assist in identifying program instructions from a library. The identified program instructions may be modified to enable them to collect the specific type of analytic data when executed by a processor. These modified program instructions may be embedded into the page data. The graphical overlay may display, based on the inputted data, some or all of the analytic data received from a remote server. The analytic data, in some examples, may be updated in real time.

Of course, the methods and systems of the above-referenced embodiments may also include other additional elements, steps, computer-executable instructions or computer-readable data structures. In this regard, other embodiments are disclosed and claimed herein as well. The details of these and other embodiments of the present invention are set forth in the accompanying drawings and the description below. Other features and advantages of the invention will be apparent from the description and drawings and from the claims.

BRIEF DESCRIPTION OF THE DRAWINGS

The present invention is illustrated by way of example and is not limited in the accompanying figures in which like reference numerals indicate similar elements and in which.

DETAILED DESCRIPTION

In accordance with various aspects of the disclosure, methods, computer-readable media, and apparatuses are disclosed that allow clients to view and report analytic data, identify elements on a page to facilitate analytic data intake, and generate rules to collect and customize analytic data. Clients may use the methods, computer-readable media, and apparatuses disclosed herein in conjunction with analytic data obtained from one or more $3^{rd}$ party vendors. Further, the methods, computer-readable media, and apparatuses may be implemented with add-ons to various applications or as a separately compiled application. Accordingly, clients may efficiently and effectively manage analytic data. Herein, analytic data may include web analytics collected by $3^{rd}$ party vendors and others. However, web analytics is just one example of analytic data. It should be understood that references made to the "analytic data" being web analytics collected by $3^{rd}$ party vendors are non-limiting examples, and that analytic data can be any data collected and/or displayed by any entity for various purposes (e.g., security purposes, troubleshooting purposes, etc.).

In some aspects of the disclosure, a graphical overlay may be used to generate rules based on user input in order to collect analytic data provided by various vendors. The graphical overlay may be configured so that a user can view both the graphical overlay and a page from which the analytic data displayed in the graphical overlay is extracted. The graphical overlay may appear in a pane alongside of the displayed page or may appear in a window that floats over at least a portion of the displayed page. Furthermore, the graphical overlay may be configured to refresh its display as the user navigates from one page to the next.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
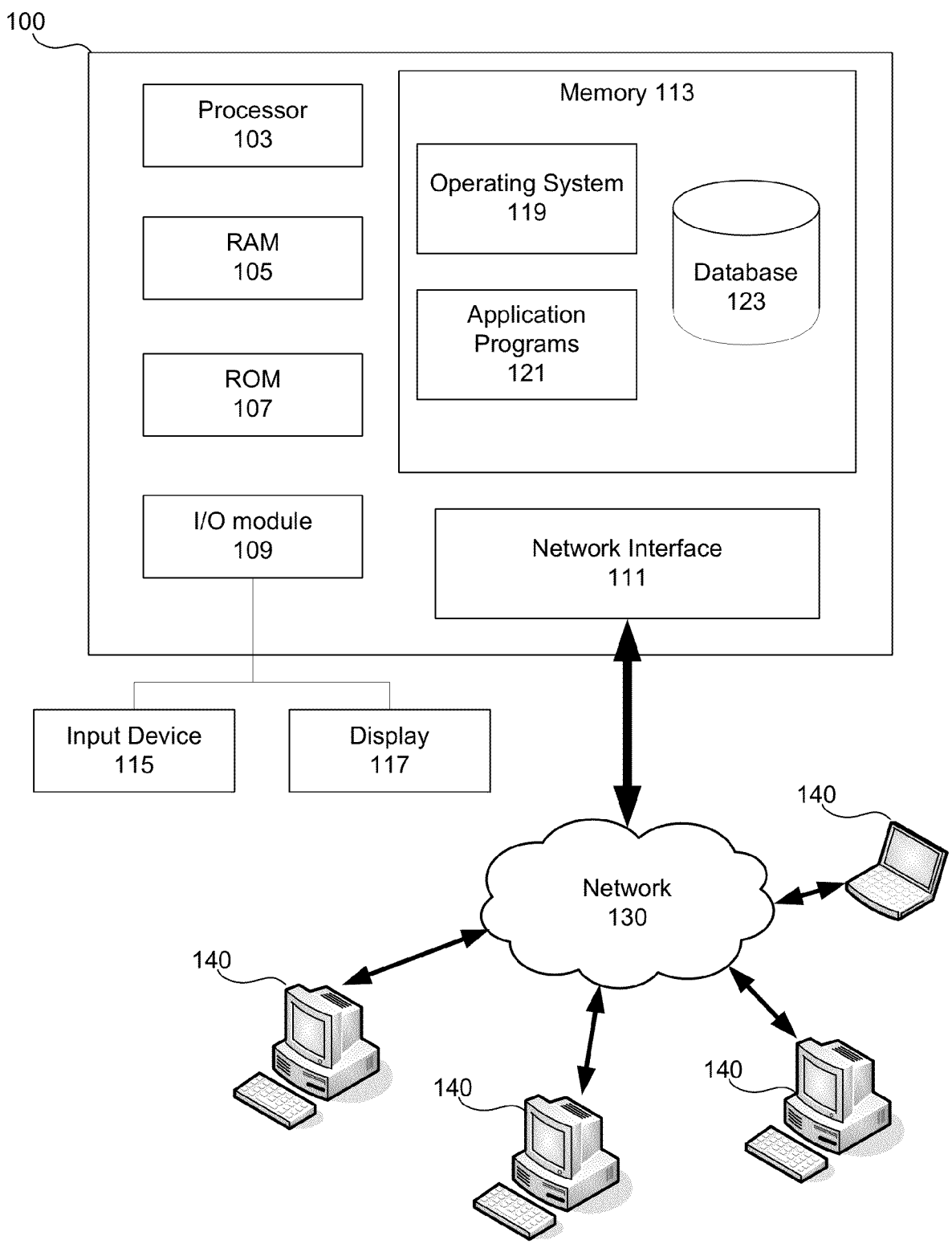
FIG. 1 is a block diagram of an example computing device that may be used according to an illustrative embodiment of the present disclosure.

FIG. 1 illustrates a block diagram of an example computing device 100 that may be used according to an illustrative embodiment of the present disclosure. The computing device 100 may be any graphical user interface (GUI), such as a personal computer (e.g., a desktop computer), server, laptop computer, notebook, tablet, smartphone, touchscreen, etc. The computing device 100 may have an analytic data manager 101 for performing methods described herein. The analytic data manager 101 may be implemented with a processor and memory. Throughout this disclosure, the analytic data manager 101 may be used to reference both a combination of the processor and memory storing instructions executed by that processor and/or the instructions themselves. The processor of the analytic data manager 101 may operate in addition to or in conjunction with another processor 103 of the computing device 100. Both the analytic data manager 101 and the processor 103 may be capable of controlling operations of the computing device 100 and its associated components, including RAM 105, ROM 107, an input/output (I/O) module 109, a network interface 111, and memory 113.

The I/O module 109 may be configured to be connected to an input device 115, such as a microphone, keypad, keyboard, touch screen, and/or stylus through which a user of the computing device 100 may provide input data. The I/O module 109 may also be configured to be connected to a display 117, such as a monitor, television, touchscreen, etc., and may include a graphics card. The display and input device are shown as separate elements from the computing device 100, however, they may be within the same structure.

The memory 113 may be any computer readable medium for storing computer executable instructions (e.g., software).

The instructions stored within memory 113 may enable the computing device 100 to perform various functions. For example, memory 113 may store software used by the computing device 100, such as an operating system 119 and application programs 121, and may include an associated database 123.

The network interface 111 allows the computing device 100 to connect to and communicate with a network 130. The network 130 may be any type of network, including a wide area network (WAN), such as the Internet, and a local area network (LAN). Through the network 130, the computing device 100 may communicate with one or more computing devices 140, such as laptops, notebooks, smartphones, personal computers, servers, etc. The computing devices 140 may also be configured in the same manner as computing device 100. In some embodiments the computing device 100 may be connected to the computing devices 140 to form a "cloud" computing environment.

The network interface 111 may connect to the network 130 via communication lines, such as coaxial cable, fiber optic cable, etc. or wirelessly using a cellular backhaul or wireless standard 802.11. In some embodiments, the network interface may include a modem. Further, the network interface 111 may use various protocols, including TCP/IP, Ethernet, File Transfer Protocol (FTP), Hypertext Transfer Protocol (HTTP), etc., to communicate with other computing devices 140.

The computing device 100 may be a mobile device (e.g., a smartphone), and thus, may also include various other components, such as a battery, speaker, and antennas (not shown).

Figure 2:
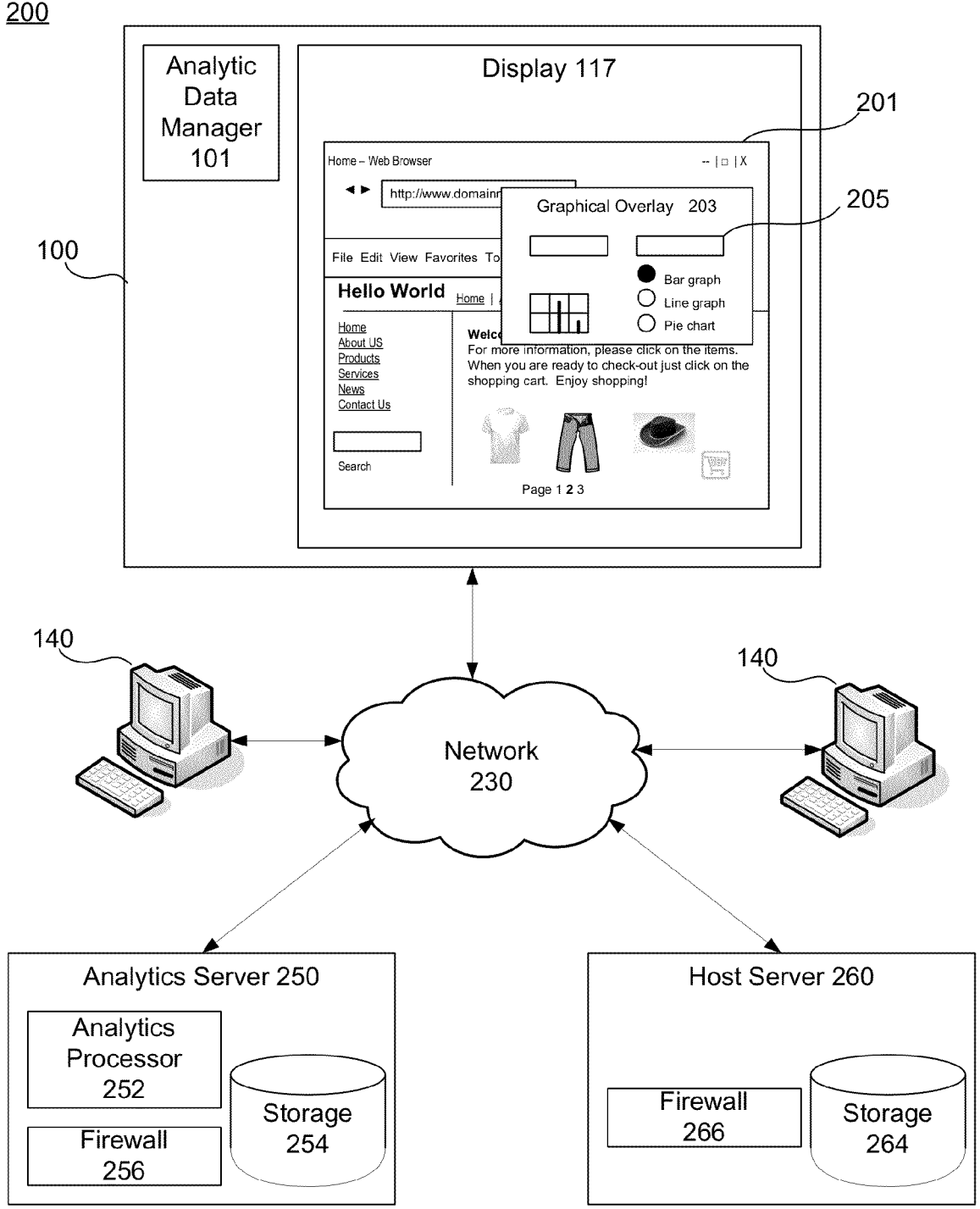
FIG. 2 illustrates an example system for implementing methods according to the present disclosure.

FIG. 2 illustrates an example system 200 for implementing methods according to the present disclosure. As shown in FIG. 2, the system may include a computing device 100, a network 230, an analytics server 250, and a host server 260. Further, one or more other computing devices 140 may be connected to the network 230. Also, although only one analytics server 250 and one host server 260 are shown in FIG. 2, the computing device 100 may communicate with more than one analytics server 250 and more than one host server 260 via the network 230 or another network.

Referring to FIG. 2, the computing device 100 may be configured to display a page 201. In particular, the analytic data manager 101 or processor 103 may execute instructions to generate the page 201 on the display 117 of the computing device 100. The analytic data manager 101 or processor 103 may execute instructions to run an application (e.g., Adobe Acrobat, Adobe Reader, Microsoft Word, Microsoft PowerPoint, etc.) or web browser (e.g., Internet Explorer, Mozilla Firefox, Google Chrome, etc.) to view the page 201. Herein, the page 201 refers to the content (e.g., text, images, video, etc.) being displayed within the application or web browser. For example, where the page 201 is viewed with Adobe Acrobat (or Adobe Reader), the page 201 is the text and/or image(s) generated by opening a portable document format (PDF) file. Or, for example, where the page 201 is viewed with a web browser, the page 201 may be a web page requested by entering a universal resource locator (URL) into the web browser.

Further, the computing device 100 may also display a graphical overlay 203. Herein, the graphical overlay 203 may refer to the graphical overlay 203 that is displayed and/or the computer executable instructions that render/generate the graphical overlay 203. As shown in FIG. 2, the graphical overlay 203 may be formed on the same display 117 as the page 201. The analytic data manager 101 may be responsible for rendering/generating the graphical overlay 203. The graphical overlay 203 may be formed in a window that "floats" over the page 201. For example, the graphical overlay 203 may be in a smaller window than that of the page 201 so that the graphical overlay 203 covers only a small portion of the page 201. In some embodiments, the window containing the graphical overlay 203 may be moved (e.g., dragged with a cursor) to any position over the page 201 and/or resized. Alternatively, the graphical overlay 203 may be formed in a pane alongside of the page 201. The pane containing the graphical overlay may be on any side (i.e., left, right, top, or bottom) of the page 201.

Whether the graphical overlay 203 is within a pane or floating window, in one example, the graphical overlay 203 may be generated from the same application or browser that generates the page 201. In such an example, it is not necessary to run a separate application to generate the graphical overlay 203; instead, the graphical overlay 203 can be generated automatically when the page 201 is generated or when a user selects to generate the graphical overlay 203 from within the application or web browser that displays the page 201. In an alternate example, the graphical overlay 203 may be generated by a different application than that which generates the page 201. In some embodiments, an icon on a toolbar or an option from a drop-down menu may be provided to allow the user to choose when to display the graphical overlay 203.

The graphical overlay 203 may be configured to receive one or more inputs (e.g., user inputs). In one example, a user may input various parameters into the graphical overlay 203 via one or more fields 205 within the graphical overlay 203. The field(s) 205 may be any component that allows data entry, such as a text box, radio button, drop-down menu, etc. Data may be entered into the fields 205 using one or more input devices 115.

While FIG. 2 shows the analytic data manager 101 included within the computing device 100, it is contemplated that the analytic data manager 101 may be separate from the computing device 100. In some embodiments, the analytic data manager 101 may be located at a remote location connected to the computing device 100 via a network. Additionally, security measures may be implemented to limit operation of the analytic data manager 101. For example, a username and/or password may need to be entered before the analytic data manager 101 will execute instructions to generate the page 201 and/or graphical overlay 203. Where the analytic data manager 101 is remotely located, the username and/or password may be for a firewall blocking unauthorized access to the analytic data manager 101. In this manner, unauthorized users can be prevented from viewing the graphical overlay 203 and performing functions associated therewith.

As shown in FIG. 2, the computing device 100 may be connected to an analytics server 250 and a host server 260 via a network 230, such as the Internet. Other computing devices 140 may also be connected to the network 230. These other computing devices 140 may be used to view the page 201.

In some embodiments, the analytics server 250 and host server 260 may be in the same location and may even be integrated together. The analytics server 250 may include an analytics processor 252, storage 254, and a firewall 256. The analytics server 250 may be configured to receive and store analytic data for the page 201 and other pages containing scripts or cookies for collecting data. Examples of the analytic data include a number of mouse-overs for certain objects on the page 201, IP addresses of visitors to the page 201, URLs or addresses of other recently visited pages, load times of page 201, full session replay (i.e., video capture of all cursor movements), etc., and other examples of analytic data that would be apparent to one skilled in the art after review of the entirety disclosed herein. This analytic data may be stored in the storage 254 of the analytics server 250. In one example, the analytic data stored in the analytics server 250 may be received whenever users visit page 201, whether from the computing device 100 displaying the graphical overlay 203 or from the other computing devices 140.

Further, the analytics processor 252 may be configured to receive parameters and other information from the computing device 100 running the graphical overlay 203, and to filter the analytic data according to the received parameters. For instance, the analytics processor 252 may evaluate all of the mouse-overs and their corresponding IP addresses to determine the geographical region with the most mouse-overs. Accordingly, data processing (e.g., filtering) can be performed on the analytics server side using data inputted through the graphical overlay 203 to reduce the amount of computation performed by the computing device 100.

The firewall 256 may be set up to protect the analytic data collected and stored by the analytics server 250. Specifically, the firewall may be configured to prevent access to the analytic data by devices other than the computing device 100 running the graphical overlay 203. The graphical overlay 203 may include verification information (e.g., username and password) to automatically authorize the computing device 100 to access the analytic data of the analytics server 250, so that a user does not have to provide further verification information once the graphical overlay 203 is initiated.

Meanwhile, the host server 260 may be any server configured to provide page data for the page 201. Where the page 201 is a webpage, the host server 260 may be a web hosting server. In some examples, the web hosting server may be maintained by a third party. When a URL for the page 201 is entered into a web browser, the web browser may retrieve the page data from the host server 260. Accordingly, the host server 260 may include storage 264 for storing the page data. Further, the host server 260 may include a firewall 266 that restricts permission to edit the page data stored therein to certain authorized users (e.g., web administrators). The firewall may require a username and/or password before allowing a user to modify the page data (e.g., web page source code). In some embodiments, the graphical overlay 203 may include additional verification information to automatically authorize the computing device 100 to download and upload the page data of the host server 260, so that a user does not have to provide further verification information once the graphical overlay 203 is initiated. Thus, the graphical overlay 203 may automatically upload modified page data, including code for carrying out rules generated with the graphical overlay 203. Alternatively, the graphical overlay 203 may upload the modified page data only when the user of the graphical overlay 203 desires.

Figure 3A:
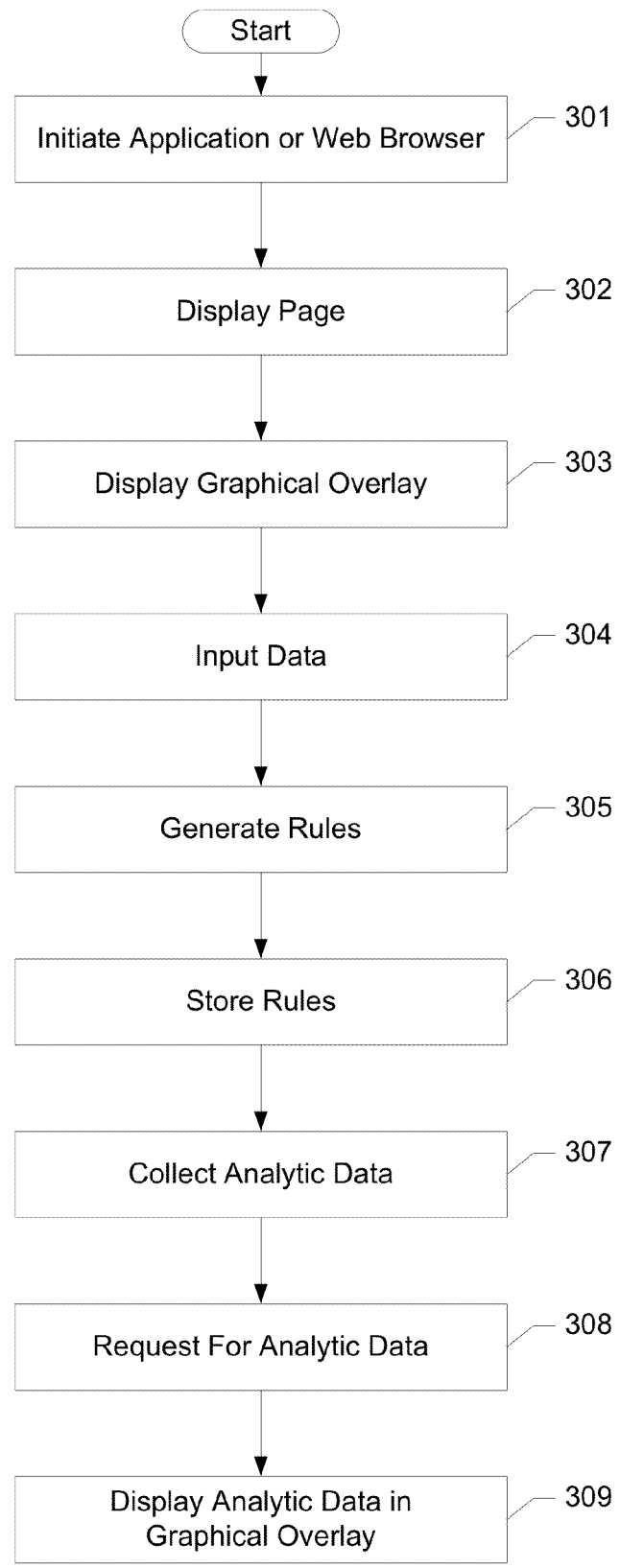
FIG. 3A illustrates a flow diagram for an example process in accordance with aspects of the present disclosure.

FIG. 3A illustrates a flow diagram for an example process in accordance with aspects of the present disclosure. In FIG. 3A, the process begins with step 301. At step 301, an application, such as Adobe Acrobat (i.e., a non-browser application), or a web browser, such as Internet Explorer, is initiated. The application or web browser may be initiated in response to a user selection or upon turning on the computing device 100. Step 301 may be performed by executing computer-readable instructions stored locally on the computing device 100 or remotely on a server or other computing device 140.

In step 302, a page 201 is displayed within the application or web browser. To display the page 201, the application or web browser reads data corresponding to a user selection. For example, if a user enters a URL into a web browser, the web browser uses the Hypertext Transfer Protocol (HTTP) to retrieve HTML data corresponding to the particular URL and renders/interprets the HTML data to display the appropriate web page. The data for generating the content of the page 201 may be stored locally on the computing device 100 or remotely on a server (e.g., host server 260) or other computing device 140.

In step 303, a graphical overlay 203 is displayed. The same application or web browser that generates the page 201 may generate the graphical overlay 203. More specifically, the application or web browser initiated in step 301 may also interpret computer readable instructions for displaying the graphical overlay 203. This may be implemented by providing a software add-on (e.g., a software plug-in) to the application or web browser for processing instructions to generate the graphical overlay 203. This software add-on may be implemented with Adobe Flash, Adobe Flex, Adobe Integrated Runtime (AIR), JavaScript, Applets, or any other platform that can interface with the application or web browser to provide the graphical overlay 203. In some embodiments, generation of the graphical overlay 203 may be triggered by a tag within the data of the page 201. Thus, the application or browser may generate the graphical overlay 203 in response to interpreting the tag among the page data. Various graphical overlays 203 may therefore be triggered by accessing various pages 201. In one or more arrangements, even different web pages of the same website may cause different graphical overlays 203 to be generated. In some examples, a mapping table (or comparable structure) may be used to maintain a map of web pages to graphical overlays. In light of the above implementations, it should be understood that a separate program does not have to be executed to generate the graphical overlay 203. Nevertheless, in some embodiments, the graphical overlay 203 can be generated by a separate application that is capable of communicating with the application or web browser.

Further, step 303 may be performed at the same time as step 302. That is, both the graphical overlay 203 and page 201 may be generated and displayed in response to the same event (e.g., a user selection to run a web browser).

Alternatively, step 303 may be performed to display the graphical overlay 203 in response to a particular user selection. In some embodiments, a user may select an icon on a toolbar or an option from a drop-down menu within the compiled application or web browser in order to trigger the generation of the graphical overlay 203. Further, before generating the graphical overlay 203, a user may be prompted to provide authentication information (e.g., a username and password). Accordingly, the graphical overlay 203 may only be displayed upon proper entry of authentication information thereby preventing unauthorized users from viewing and using the graphical overlay 203.

Once the graphical overlay 203 is displayed, a user may input data into the graphical overlay at step 304. The input data acquired at step 304 may include graphical overlay design information, report layout information, analytic data type information, analytic data storage location information, object identification information, parameter information, backend system information, user-specific information, external data source information, and/or event information. Herein, the graphical overlay design information refers to information that controls the design of the graphical overlay 203. Such information may include color, font, size, etc., which determine the format of the graphical overlay. The report layout information refers to information that indicates the desired layout of the graphical overlay 203, including information indicating how the analytic data is displayed. For example, report layout information may indicate that the analytic data should be shown in a bar graph, pie chart, spreadsheet, line graph, etc. The analytic data type information refers to information specifying a type of analytic data that is desired to be collected or displayed in the graphical overlay 203. For instance, the analytic data type information may indicate that analytic data regarding mouse-overs, page load times, IP addresses of visitors, the URLs of pages visited prior to the current page 201, etc. are desired. Analytic data storage location information refers to information indicating where collected analytic data is to be stored and/or from where the analytic data to be displayed is retrieved. Accordingly, the analytic data storage location information may be a uniform resource identifier (URI) (e.g., a URL) or another memory address. Object identification information refers to information identifying objects/elements/items within the displayed page 201 for which analytic data is desired. Objects may include links, advertisements, text, images, video, audio, or any specified area of a displayed page 201. Parameter information refers to information used for filtering analytic data during analytic data collection and/or reporting. The parameter information may specify one or more parameters, which include percentages, thresholds, intervals, and other limits. The backend system information may include details regarding changes made to a specific page (e.g., changes to the source code or scripts embedded in tags of a webpage). In some embodiments, the backend system information may include or be derived from a change log file of a content management system. Such backend system information allows a user to view a history of changes made to a particular page through the graphical overlay 203. User-specific information may include comments or notes of a specific user of the graphical overlay 203. External data source information may include information identifying external data sources related to the displayed page (or related to elements of the page) and other information regarding the external sources (e.g., status information, contact information, etc.). Event information refers to any information that characterizes an event, which is used to trigger the collection of analytic data. Event information may include information related to one or more events, the relationship between the events, and/or any information that defines conditions for triggering analytic data collection. Event information may indicate whether events are to occur simultaneously, in a particular sequence, or with no particular relationship. As described below, one or more types of the above information may be used to generate rules to facilitate analytic data collection.

Further, in step 304, one or more inputs of each of the graphical overlay design information, report layout information, analytic data type information, analytic data storage location information, object identification information, parameter information, and event information may be acquired. The user may input data using a keyboard, mouse, touch screen, stylus, etc. As discussed above, the graphical overlay 203 may include various fields 205 for receiving the inputted data.

In some embodiments, the user may input data directly into the fields 205 of the graphical overlay 203. For example, the user may click on a field and then type data into the field, or select an input from a list of available inputs. Where a list of available inputs is provided, the list displayed in the graphical overlay 203 may depend on the content of the simultaneously displayed page 201. For instance, where the page 201 is a webpage, the graphical overlay 203 may display a list of hyperlinks contained within the webpage.

Alternatively, the user may input data into the graphical overlay 203 by selecting one or more objects/elements/items appearing on the page 201. For example, the user may select a link from within a webpage by first activating a selection tool from within the graphical overlay 203, which may modify the appearance of a cursor. Then, the user may move a mouse to position the cursor over the desired link on the webpage, and click the mouse to select the desired link. Clicking on the link in the webpage may populate a field within the graphical overlay 203 to indicate selection of the desired link. For example, the destination address (e.g., URL) of the link, the text/image that forms the link, or another symbol that represents selection of the link may appear in the graphical overlay 203. The graphical overlay 203 can then display analytic data related to the link or generate rules for collecting analytic data corresponding to the selected link as explained in further detail below.

It should be understood that the above example is just one way in which objects/elements/items may be inputted into the graphical overlay 203. Various methods for selecting objects/elements/items can be used, such as drag-and-drop, drawing a box around the desired object(s), session capture (i.e., capture all/most movements within a certain time frame), etc. In order to enable selection of elements within a web page, the graphical overlay 203 may incorporate or interface with a parser that may parse HTML and/or XML elements using the Document Object Model (DOM). After parsing the web page using the DOM, the graphical overlay 203 may import HTML and/or XML elements from the DOM document. Here, importing HTML and/or XML elements may include replicating the selected HTML and/or XML elements or generating an object or other information that may subsequently identify selected HTML and/or XML elements.

In some embodiments, the input data may not be shown in the graphical overlay 203. Even though the graphical overlay 203 may receive input data when, for example, a user clicks on an object in the page 201, only the analytic data corresponding to the input data (i.e., not the input data itself) may be displayed. However, in such cases, the graphical overlay 203 is still considered to have received the input data because the computer readable instructions associated with the graphical overlay 203 are responsible for handling the input data.

In step 305, rules may be generated based on the input data obtained in step 304. More specifically, the input data may be used to generate computer-readable instructions (i.e., program instructions) that when executed can facilitate the collection and display of analytic data. In particular, the input data may be used to generate code in JavaScript, Adobe Flash, etc. For example, the input data may be used to generate code that includes a JavaScript function capable of detecting one or more various events, such as mouse-overs or visits to the page 201. For the purpose of generating code, the graphical overlay 203 may have access to pre-written program instructions (e.g., JavaScript functions in a JavaScript library), which may be stored at the computing device 100 or at a remote location, such as a server of a web analytics vendor. The graphical overlay 203 can embed one or more of these pre-written program instructions (e.g., functions) into the data of the page 201 or insert a pointer (e.g., a script tag referencing code stored on a remote server) to one or more of these pre-written program instructions into the data of the page 201. Thus, the pre-written program instructions may be inserted into the file including the data for generating the page 201 so that the pre-written instructions can be interpreted along with the page data when later accessed. Further details on the process of generating rules are provided below with respect to FIG. 3B.

One or more rules may be generated in step 305. That is, one or more blocks of code, each including one or more functions, may be embedded into a page 201 at step 305. Further, the generated rules may perform various tasks, such as setting up conditions for acquiring analytic data and filtering analytic data. For example, a user may input event information into the graphical overlay 203 to generate a rule that detects when a mouse is positioned over a specified object on the page 201 for a particular period of time, while another rule is generated to limit the analytic data to mouse-overs by visitors having international IP addresses. Accordingly, through customizing the collection of analytic data, a user of the graphical overlay 203 can evaluate the analytic data from many angles.

Additionally, previously existing rules may be modified in step 305. The graphical overlay 203 may automatically display one or more rules that exist for the currently displayed page 201. Alternatively, existing rules are shown in the graphical overlay 203 in response to a user request or user selection of an object related to the existing rule. In other words, if analytic data is already being collected for mouse-overs of a particular element within page 201, then when a user selects the particular element, the graphical overlay 203 may indicate that mouse-overs are being detected for that element. Moreover, the graphical overlay 203 may display the analytic data and information associated with the current rule, so that a user can assess whether the rule is providing useful data.

In step 306, the page data including the newly generated rules may be stored. Step 306 may be performed automatically after each rule is generated or in response to a user instruction. In some embodiments, the page data having the new rules may be stored on the same computing device 100 which was used to input data to create the rules. Alternatively or additionally, the page data having the new rules may be stored on a remote host server/computer. For example, where the page data having the rules corresponds to modified source code for a webpage, the modified source code may be uploaded to the host server 260 so that analytic data can be collected according to the new rules.

Once the page data, including the new rules, are stored, analytic data may be collected according to the new rules at step 307. More specifically, scripts (e.g., JavaScript functions) embedded within the page data may operate to collect analytic data according to the new rules whenever the page 201 is accessed. Moreover, each script may include one or more URIs (e.g., URLs) indicating one or more destinations for the analytic data. Therefore, a script may transmit the same analytic data to more than one analytics server 250. Also, the different scripts within the page data may transmit the collected analytic data to different destinations. Thus, a user of the graphical overlay 203 may design the page 201 to include one script that transmits analytic data to one analytics server 250 and another script that transmits different analytic data to a different analytics server 250.

In step 308, analytic data may be requested. The request for analytic data may be transmitted from the graphical overlay 203 through the network 230 to the analytics server 250. The request for analytic data may be sent periodically at defined intervals or in response to a user input into the graphical overlay 203. The request may also be sent whenever a user first navigates to a page 201 or at some set time thereafter.

In some embodiments, the request for analytic data sent in step 308 includes input data received in step 304. In such embodiments, the analytics server 250 may use the input data sent with the request to filter the analytic data previously collected. Therefore, the analytics server 250 may transmit only the filtered analytic data back to the graphical overlay 203. For example, the request for analytic data may include a date range, so that only analytic data collected within that range is transmitted back to the graphical overlay 203.

In one or more other embodiments, the request for analytic data may not include input data. Thus, the analytics server 250 may return all analytic data for the particular page 201. In this case, the graphical overlay 203 may filter all of the analytic data according to the data inputted at step 304. For example, the graphical overlay 203 may grab only IP addresses of web page visitors from among various types of analytic data received based on inputted data.

Whether the analytic data is filtered by the graphical overlay 203 or the analytics server 250, it may be displayed in the graphical overlay 203 at step 309. In certain aspects of the disclosure, the graphical overlay 203 may be displayed while the user navigates through pages 201. That is, as a user navigates from one page to the next, the graphical overlay 203 may update its display to show analytic data corresponding to the currently displayed page.

It should be understood that the process in FIG. 3A is an example, and that certain steps may be reordered, omitted, added, or combined. For example, steps 305 and 306 may be omitted in an embodiment where the graphical overlay is used for the sole purpose of viewing analytic data collected according to previously set rules. Also, step 309 may be performed immediately after the graphical overlay is displayed in step 303.

Figure 3B:
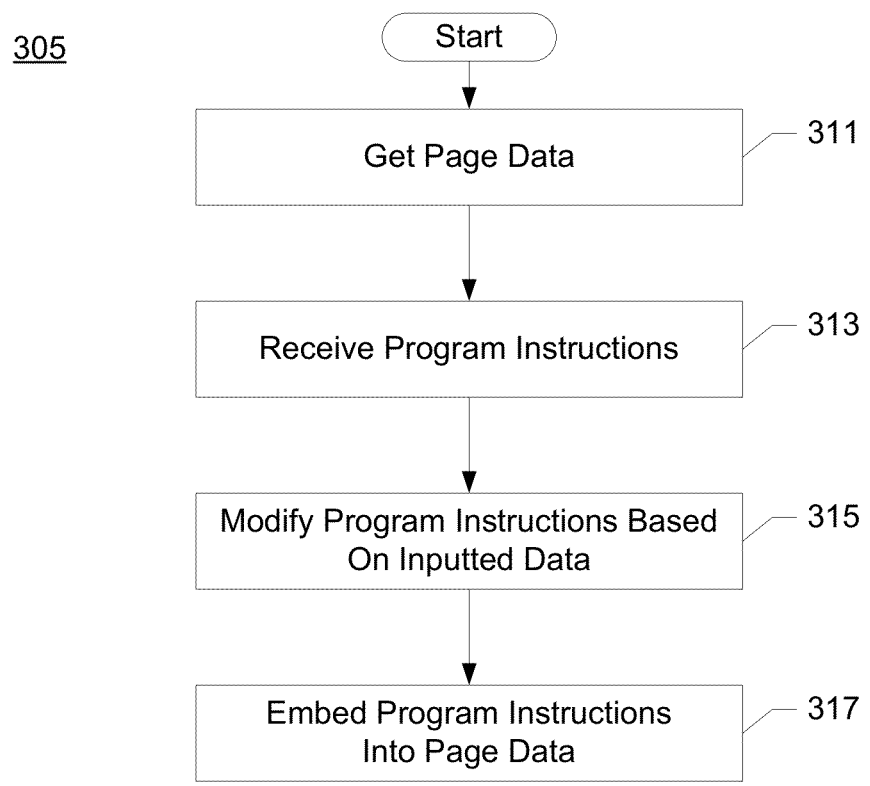
FIG. 3B illustrates a flow diagram for an example process of generating rules in accordance with aspects of the present disclosure.

FIG. 3B illustrates a flow diagram for an example process of generating rules. The steps of FIG. 3B may be performed at step 305 of FIG. 3A. As shown in FIG. 3B, the process of generating rules begins at step 311 in which page data of the page 201 being displayed is received. Where the page 201 is a web page, this page data refers to the source code used by a web browser to interpret the web page.

In step 313, the graphical overlay 203 receives program instructions. In some embodiments, the graphical overlay 203 may retrieve computer program instructions (e.g., a program function) from a library of pre-written program instructions. Further, the graphical overlay 203 may search for the appropriate program instructions based on data inputted into the graphical overlay 203. For example, if inputted data includes analytic data type information indicating that mouse-overs are desired, then the graphical overlay may retrieve a mouse-over function (e.g., JavaScript mouseover( ) function) from a library of available program instructions. Also, a user may use the graphical overlay 203 to select the desired program instructions from the library of available program instructions. For instance, a user may select program instructions by choosing a name representing the program instructions from a drop-down menu appearing in the graphical overlay 203. In some embodiments, the library of available program instructions may be provided by one or more third party vendors (e.g., web analytics vendors). Also, the pre-written program instructions may be offered in various computer languages (e.g., JavaScript, Adobe Flash, etc.). The library may contain scripts for performing any function with respect to any object (e.g., JavaScript objects, browser objects, DOM objects, etc.). For example, the library may include scripts for executing any type of event handler/listener and/or document object methods, such as getElementsByTagName( ), write( ), open( ), etc. One of skill in the art will appreciate after review of the entirety disclosed herein that numerous examples of event handlers and methods are known in the art and are contemplated herein in accordance with the disclosure.

In some embodiments, multiple libraries may be formed on the basis of which browser supports the methods and event handlers/listeners contained therein. For example, one library may be configured to support Mozilla Firefox™, while another library may be configured to support Microsoft Internet Explorer™.

Additionally, or alternatively, the graphical overlay may allow a user to enter program instructions. That is, the graphical overlay 203 may include an area that permits a user to supplement the provided information by writing program instructions in one or more languages (e.g., JavaScript, Adobe Flash, etc.).

In step 315, after the program instructions are received from a library, the program instructions may be modified based on the data inputted at step 304. More specifically, the input data may be used to create parameters, variables, and/or constants for a particular pre-written function obtained from the library in step 313. For example, if mouse-overs for a particular object are desired, then the program instructions for detecting mouse-overs (e.g., a JavaScript mouseover( ) function) may be modified to detect mouse-overs for the particular object identified by using object identification information for the particular object inputted at step 304 as a constant within the program instructions. Also, when a certain number of mouse-overs of the particular object are to be detected, input data entered into the graphical overlay 203 indicating the certain number may be included as a parameter in a call to the JavaScript function. Although the mouseover( ) function is described in the example above, the graphical overlay 203 may modify any event handler/listener.

Further, step 315 may be performed to modify an application or browser's built in methods. The application or browser's built in methods may be modified with program instructions received in step 313. The modifications may provide various ways to listen to one or more events and represent those events in the overlay 203. More specifically, modified program instructions may be generated to interpret objects and events from, for example, the DOM of a particular page 201. For example, known program instructions may be modified to listen to certain DOM events and detect an event (e.g., an AJAX event) based on a series of DOM events. The manner in which the modified program instructions are generated may vary. The modified program instructions may be generated by adding or removing a specific event listener using, for example, a generic add or remove event listener method (e.g., the addEventListener( ) and the removeEventListener( )) for a target event. That is, target events specified by data inputted at step 304 may be used as parameters for event listeners. Moreover, the generic event listeners may be modified with or called from within additional code directing the browser or application on how it should handle the results of the generic event listeners. This additional code may be a function that is modified to include event listeners based on data inputted at step 304. For example, a predefined function may exist for outputting data passed to it from any event listener, and therefore, step 315 may be performed to specify the event listener called by such function. The function may be a newly added function or an existing function of the browser.

Then, in step 317, the program instructions (modified or unmodified) are embedded into the page data of the page 201. In some embodiments, the user of the graphical overlay 203 may choose where in the page data to embed the modified program instructions. In other embodiments, the graphical overlay 203 may automatically determine where to embed the modified program (e.g., at or near the top of the page data).

Where the page 201 is a web page, the pre-written program instructions may be inserted into the source code of the web page. For example, if analytic data indicating the number of mouse-overs for a particular element or object is desired to be collected, the program instructions for collecting such information may be embedded into the source code in step 317. The graphical overlay 203 may implement a document object method (e.g., write ( ), writeln( ), etc.) to embed scripts for event handling/listening and performing functions to output results of event listeners. The graphical overlay 203 may also embed one or more tags. The tag(s) may provide access to the data collected by the event handlers/listeners embedded into the page 201. Accordingly, the graphical overlay 203 may function as an XML editor to insert tags into the source code that may call the pre-written program instructions. Depending on the analytic data to be collected, the pre-written program instructions may be inserted into the header, body, or other part of the web page. For instance, if the analytic data to be collected relates to whether a particular link is clicked, then the pre-written program instructions may be inserted into the body of the current webpage. As a result, when a page 201 having embedded pre-written program instructions is accessed, the pre-written program instructions may operate to detect events and collect analytic data.

It should be understood that the process in FIG. 3B is an example, and that certain steps may be reordered, omitted, added, or combined. For example, step 311 may be performed after the program instructions are modified in step 315. Also, in some embodiments, the program instructions may not be modified, and therefore, step 315 may be omitted.

Figure 4:
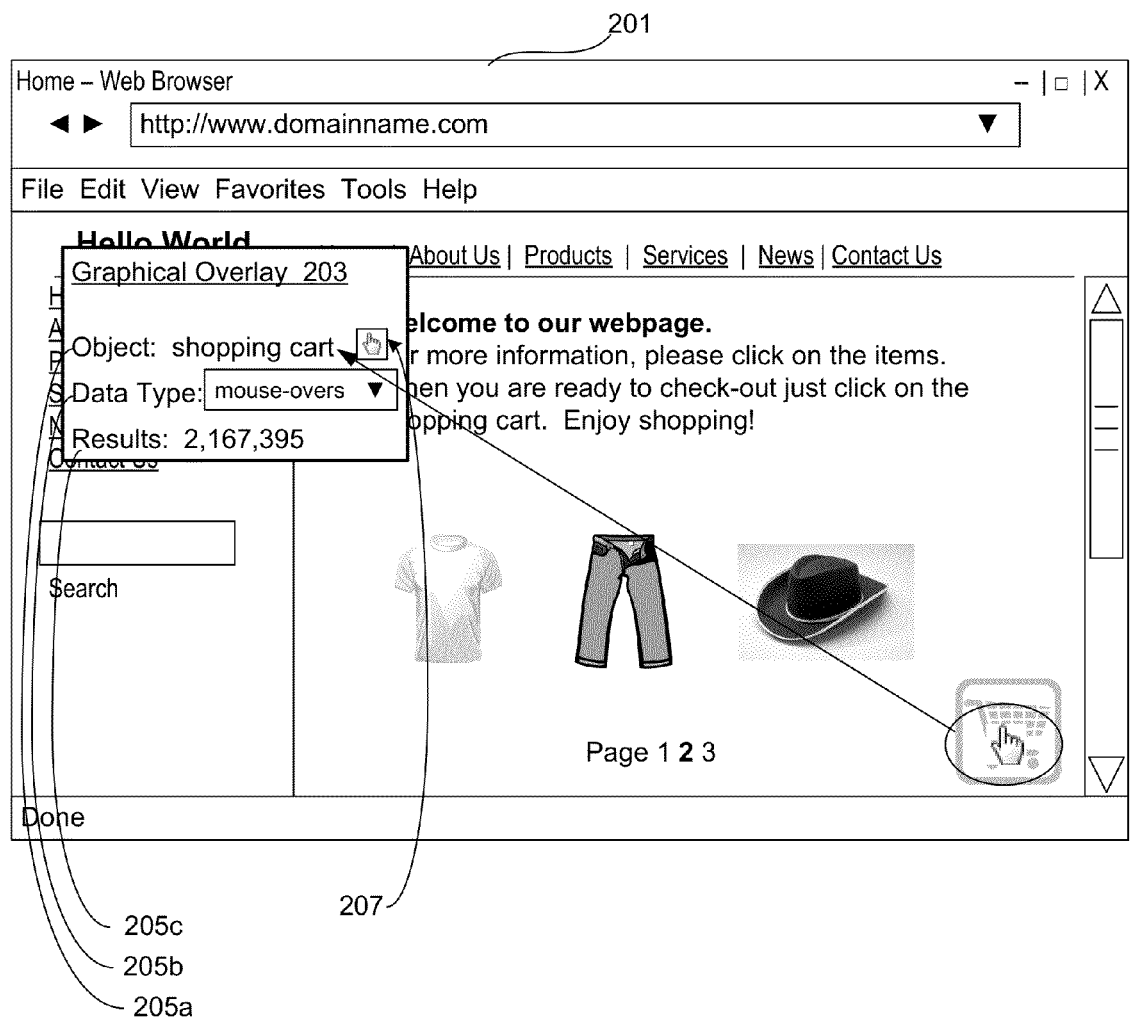
FIG. 4 is an example high level diagram illustrating a function of a graphical overlay in accordance with aspects of the present disclosure.

FIG. 4 is an example high level diagram illustrating a function of the graphical overlay 203. More specifically, FIG. 4 shows that the graphical overlay 203 may be used to select an object from within a page 201. In FIG. 4, the page 201 is a web page accessed with a web browser of the computing device 100. The same web browser that accesses the web page 201 may also render/interpret the graphical overlay 203. As a result, the web browser may display the graphical overlay 203 as a window that floats over the web page 201. Accordingly, both the web page 201 and graphical overlay 203 may be simultaneously displayed.

As shown in FIG. 4, the web page 201 contains a number of objects, such as icons for clothing items that may be purchased. A user may view analytic data for a particular object by selecting one of the objects within the web page 201. Here, FIG. 4 shows that the graphical overlay 203 is being used to select a shopping cart icon having an associated hyperlink. In order to select the shopping cart, a user may first click on a selection tool 207 from within the graphical overlay 203. The selection tool 207 may change the shape of the cursor and may allow the user to select an object without navigating away from the current web page 201 (i.e., may not follow the hyperlink). Upon selection of the shopping cart icon, a field 205a for inputting an object may be populated. This is represented in FIG. 4 by insertion of the words "shopping cart" into the object field 205a of the graphical overlay 203. Further, the graphical overlay 203 may provide an analytic data type field 205b to allow the user to view a desired type of analytic data for the selected object. For example, the user may choose to view mouse-overs for the shopping cart by selecting "mouse-overs" from a drop-down menu in field 205b. As a result of entering data into both the object field 205a and the analytic data type field 205b, the graphical overlay 203 may display a number of mouse-overs for the shopping cart object in a result field 205c.

In some embodiments, the graphical overlay 203 may automatically send a request to the analytics server 250 in response to the entering of data into both the object field 205a and the analytic data type field 205b. The analytics server 250 may then respond to the request with the results, which are displayed in the result field 205c. Alternatively, in response to the entering of data into both the object field 205a and the analytic data type field 205b, the graphical overlay 203 may request all analytic data from the analytics server 250 and determine the desired results itself. Still, in other embodiments, the graphical overlay 203 may have previously obtained all of the analytic data from the analytics server 250 (e.g., when the web page 201 was first accessed), and thus, the graphical overlay 203 may display the desired results without having to send a subsequent request.

Furthermore, the graphical overlay 203 may include instructions for continuously updating the desired results. For example, the graphical overlay 203 may include instructions to periodically send a request to the analytics server 250 after a predetermined period of time in order to obtain the most recent analytic data. Additionally, or alternatively, the analytics server 250 may push updated analytic data to the graphical overlay 203. In any case, referring to FIG. 4, the number of mouse-overs for the shopping cart shown in the result field 205c can be refreshed after a relatively short predetermined period of time. Thus, the graphical overlay 203 may display the desired results in real time.

Figure 5:
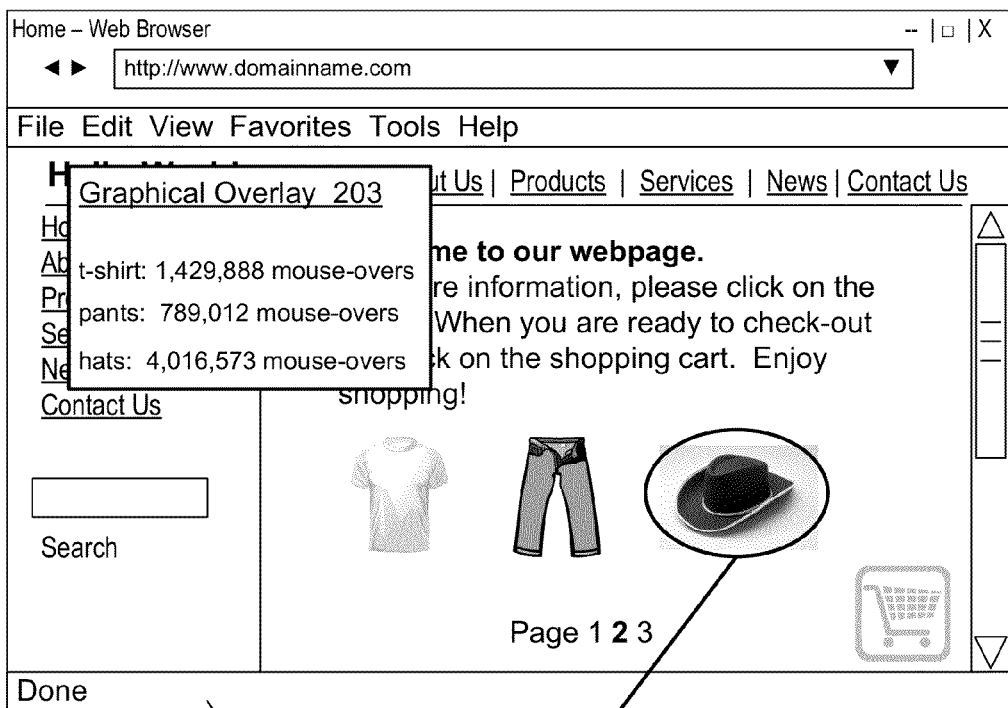
FIG. 5 is an example high level diagram illustrating another aspect of the present disclosure.
Figure 5:
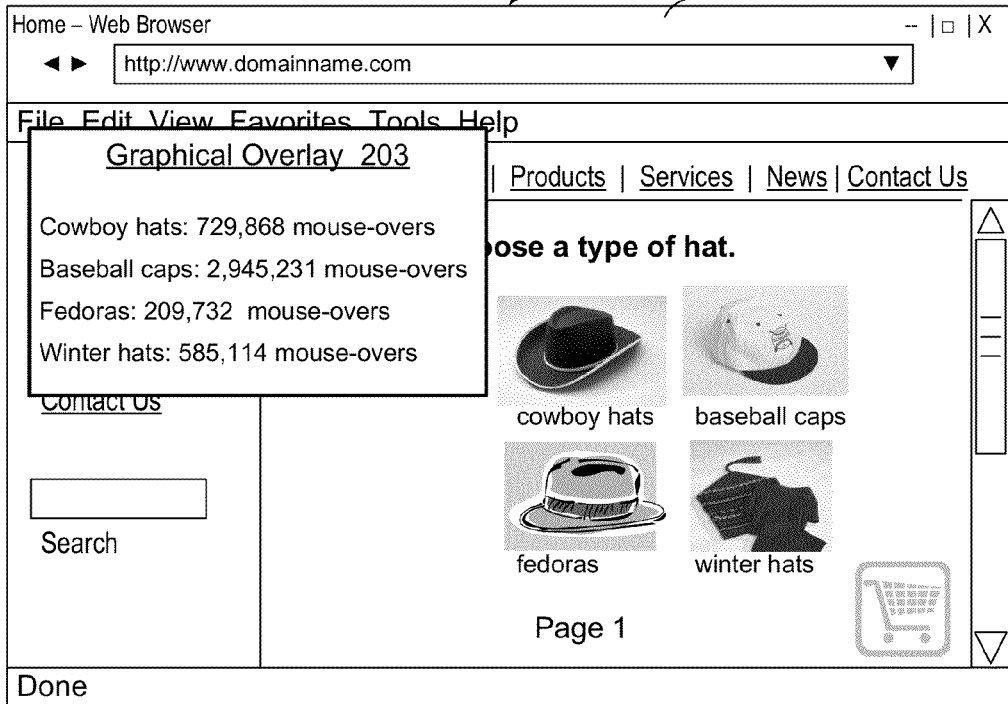

FIG. 5 is an example high level diagram illustrating another aspect of the disclosure. In particular, FIG. 5 illustrates the ability of a computing device 100 to continuously display the graphical overlay 203 while a user navigates a plurality of pages 201. As shown in FIG. 5, the computing device 100 may display a first web page 201A using a web browser. The web browser may also execute computer readable instructions to generate the graphical overlay 203 for displaying analytic data of the first web page 201A currently being viewed. Here, the graphical overlay 203 shows, for example, analytic data, such as a number of mouse-overs, for various objects (e.g., a t-shirt icon, a pants icon, and a hat icon) on the first web page 201A. Again, the graphical overlay 203 floats over the first web page 201A so that the content of the first web page 201A and the corresponding analytic data in the graphical overlay 203 are simultaneously displayed. Further, the graphical overlay 203 does not reduce the functionality of the web browser. That is, the web browser may perform all of the functions that it typically would be able to. Accordingly, the user may select a link from within the first web page 201A to navigate to a second web page 201B. For example, as shown in FIG. 5, a hat icon having a hyperlink may be selected to navigate to the second web page 201B corresponding to the hyperlink of the hat icon.

In response to a user's decision to navigate to a second web page 201B, the web browser may update the graphical overlay 203. In other words, the graphical overlay 203 may refresh its display to show analytic data, such as a number of mouse-overs, for objects currently being displayed on the second web page 201B (e.g., a cowboy hat icon, a baseball cap icon, a fedora icon, and a winter hat icon). The computer readable instructions (i.e., computer code) for running the graphical overlay 203 may communicate with the web browser displaying the first and second web pages 201A and 201B so that the graphical overlay 203 may update automatically upon navigating to the first and second web pages 201A and 201B. Each time the user navigates to a new web page, the graphical overlay 203 may send a request to the analytics server 250 for analytic data corresponding to the new page or the analytics server 250 may automatically push the new analytic data to the graphical overlay 203. Accordingly, the graphical overlay 203 may display analytic data in real time.

Figure 6:
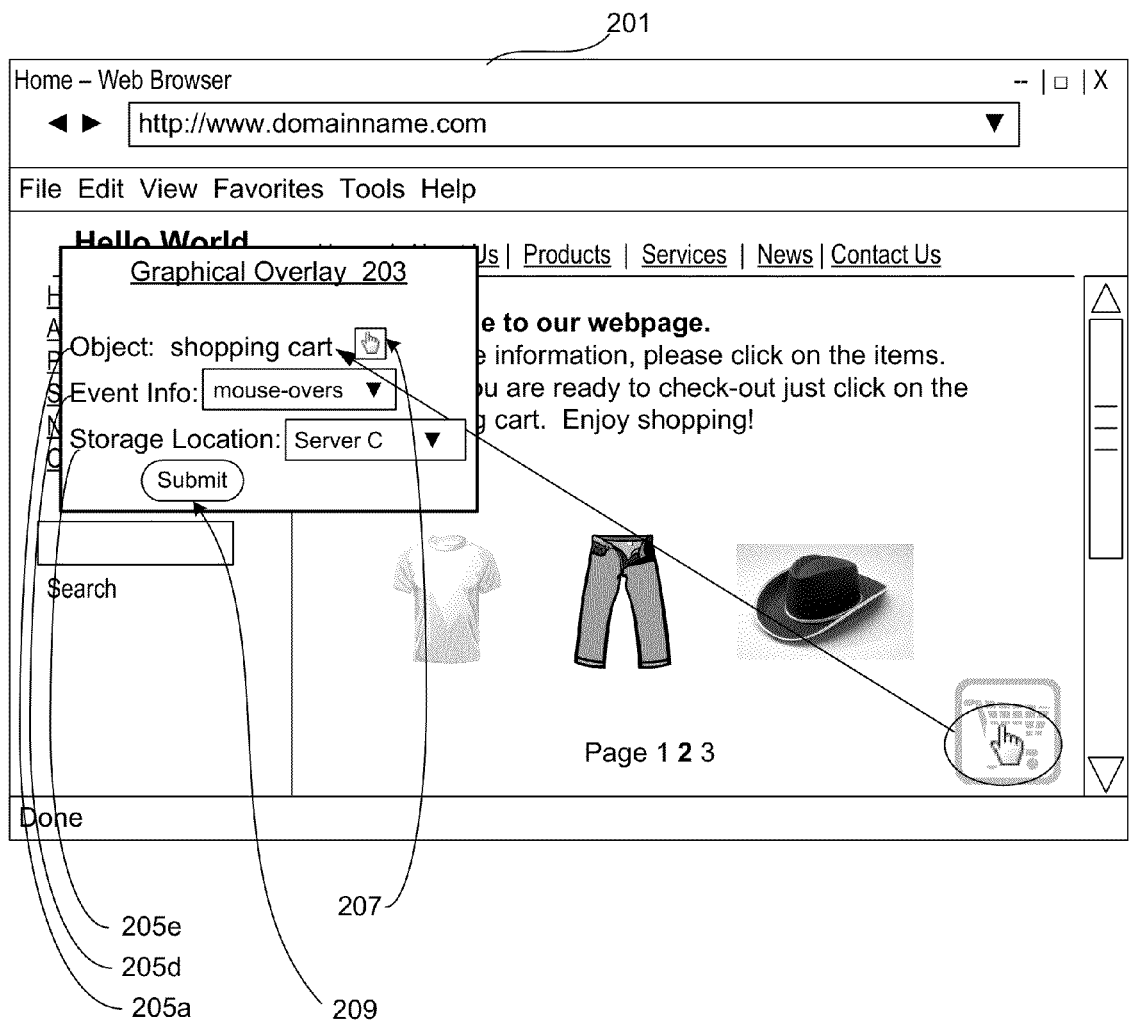
FIG. 6 is an example high level diagram illustrating another function of the graphical overlay in accordance with aspects of the present disclosure.

FIG. 6 is an example high level diagram illustrating another function of the graphical overlay 203. More specifically, FIG. 6 illustrates that the graphical overlay 203 may generate rules to facilitate analytic data collection. FIG. 6 shows a web page 201 similar to those shown in FIGS. 4 and 5, and a graphical overlay 203 floating over the web page 201.

The number and type of fields shown in FIG. 6 represent an example embodiment, and more or fewer fields may be used to generate rules. The graphical overlay 203 in FIG. 6 includes an object field 205a, an event information field 205d, and a storage location field 205e. The object field 205a may be similar to the object field described with respect to FIG. 4. Moreover, as explained above, the object field 205a may be populated using a selection tool 207 to select a shopping cart icon within the web page 201.

Additionally, here the graphical overlay 203 includes the event information field 205d for receiving data regarding a type of event to detect. For example, as shown in FIG. 6, the event information may indicate that mouse-overs are to be detected. The event information field 205d may be implemented with a drop-down menu thereby allowing the user to select from a given list of events that may be detected. The type of events that may be detected may depend on the different blocks of code that are available to the graphical overlay 203. In other words, in some embodiments, the graphical overlay 203 may only have access to computer code that detects IP addresses and mouse-overs, and therefore, in such embodiments, the drop-down menu may only allow a user to choose event information indicating whether IP addresses and/or mouse-overs are to be detected.

Further, the graphical overlay 203 includes the analytic data storage location information field 205e. The analytic data storage location information field 205e receives a user input indicating where the analytic data to be collected should be stored. The graphical overlay 203 may be configured to interface with a number of different vendors that provide web analytics. Thus, the graphical overlay 203 may include the analytic data storage location information field 205e to designate which of the multiple vendors should store the collected analytic data. The analytic data storage location information field 205e may also allow a user to choose a private storage location (e.g., a private server) to store the analytic data.

In some embodiments, a submit button 209 may exist within the graphical overlay 203 so that the user may confirm that he/she desires to generate a rule according to the input data within one or more of the fields 205. Upon selection of the submit button 209, the graphical overlay 203 may insert a script into the HTML source code of the web page 201 and upload the modified source code to a host server 260 so that analytic data may begin to be collected in accordance with the newly generated rule. Thus, the graphical overlay 203 may allow a user to generate rules for collecting analytic data from within the actual environment that the analytic data is collected.

Figure 7:
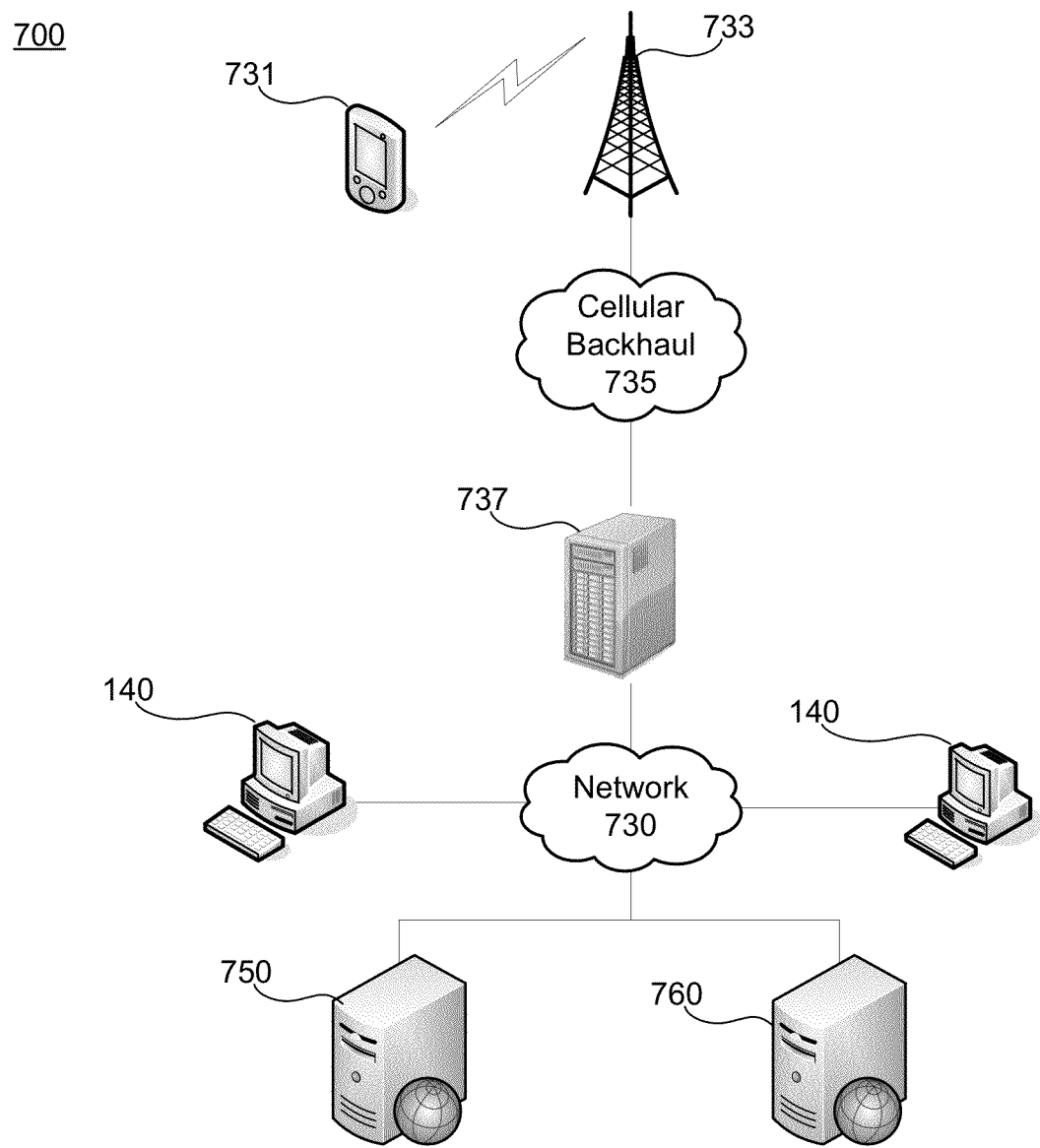
FIG. 7 illustrates another example system for implementing methods according to the present disclosure.

FIG. 7 illustrates an example system 700 for implementing methods according to the present disclosure. As shown in FIG. 7, the system may include a smartphone 731, a cell tower 733, a cellular backhaul 735, a gateway GPRS support node (GGSN) 737, a network 730 (e.g., the Internet), an analytics server 750, and a host server 760. Further, one or more other computing devices 140 may be connected to the network 730.

In the example system 700, the smartphone 731 may wirelessly communicate with the cell tower 733. Meanwhile, the cell tower 733 may be connected to the GGSN 737 through the cellular backhaul 735. The cellular backhaul 735 may include both wired and wireless connections. The GGSN 737 may be configured to interface the cellular backhaul 735 with the network 730, such as the Internet. Accordingly, the smartphone 731 may communicate with the web analytics server 750 and host server 760 to perform one or more of the various functions disclosed herein.

Figure 8:
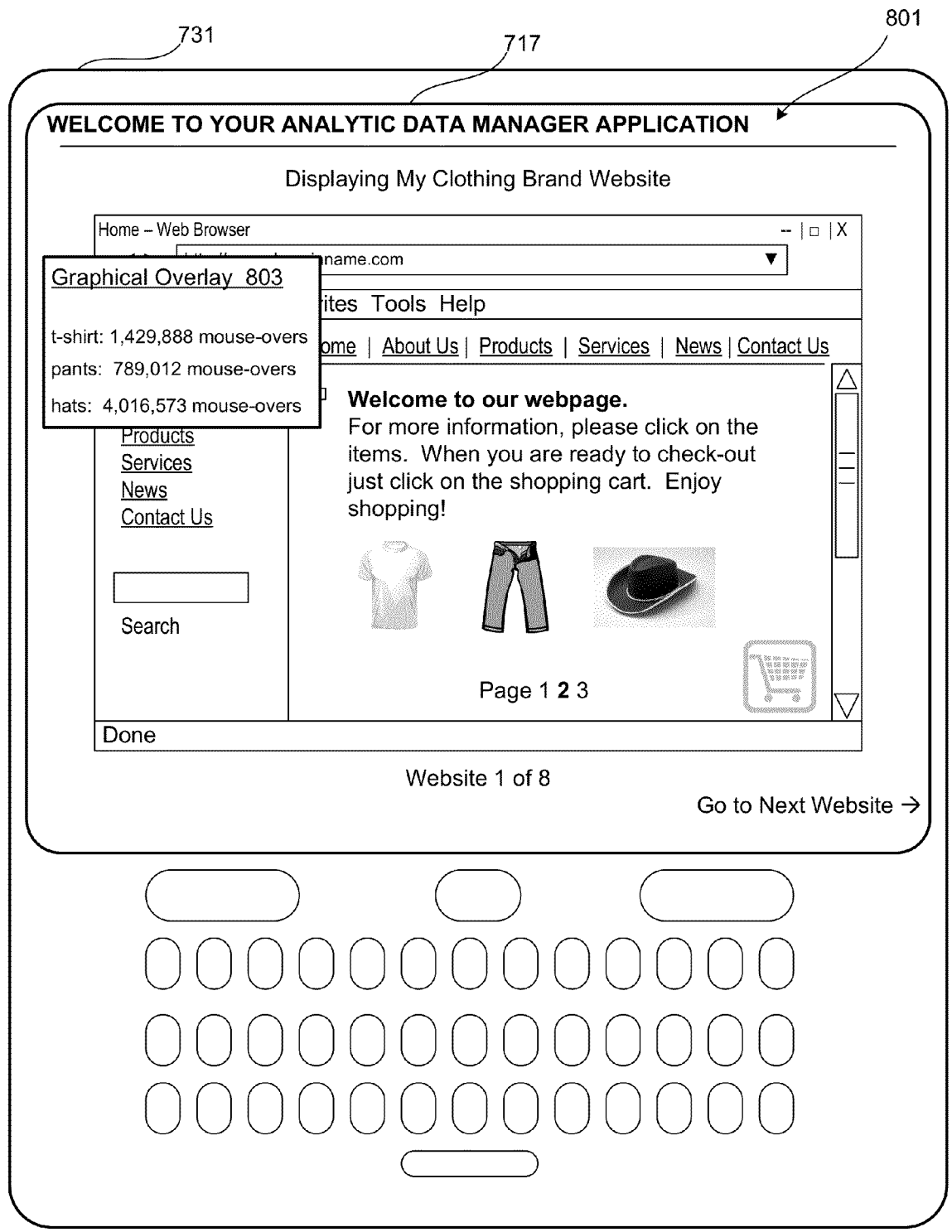
FIG. 8 is an example high level diagram illustrating another aspect of the present disclosure.

Referring to FIG. 8, the smartphone 731 may be configured in a manner similar to the computing device 100 of FIG. 1. Thus, the smartphone 731 may include a display 717 for displaying a page 801. In particular, the analytic data manager 101 or processor 103 (not shown) of the smartphone 731 may execute instructions to generate the page 801 on the display 717 when a user selects a button to run a specially designed application (hereinafter referred to as "the analytic data manager application"). The analytic data manager application may be built to run as a compiled application on a platform, such as Adobe Integrated Runtime (AIR) and/or may be compatible with various mobile device operating systems, such as iOS, Android, Windows Phone, BlackBerry OS, etc.

As shown in FIG. 8, the analytic data manager application may load a page 801, including information related to a website that may be managed by a user of the smartphone having the analytic data manager application. Here, the page 801 refers to all items/elements currently viewable on the display 717. Thus, while the page 801 may display items found on a web page, it may not actually be a web page (i.e., page 801 may not be written in HTML). Instead, the page 801 may be written in another language that may be rendered/interpreted by the analytic data manager application.

FIG. 8 further shows that the analytic data manager application may generate a graphical overlay 803. The graphical overlay 803 may appear in a window that floats over the page 801 or in a pane alongside of the page 801 so that the page 801 and graphical overlay 803 are simultaneously displayed. The analytic data manager application may automatically display the graphical overlay 803 whenever the application is run or may display the graphical overlay only when a user chooses to view the graphical overlay 803.

The graphical overlay 803 may perform any of the functions as the graphical overlay 203 described above. For example, as shown in FIG. 8, the graphical overlay may display analytic data that is received from an analytics server 750, which collects the analytic data for the page 801. Also, the graphical overlay 803 may, for example, generate rules for collecting analytic data of specified objects within the page 801 based upon input data entered into the graphical overlay 803. More specifically, the analytic data manager application may take the input data entered into the graphical overlay 803 and insert a script into the page data for the page 801. Further, the analytic data manager application may be configured to publish (or upload) the modified page data for the page 801 to the host server 760.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A non-transitory computer-readable medium storing computer-executable instructions that, when executed by a processor, cause a computing device to perform steps comprising:

providing a graphical overlay over a web page, the web page having a script configured to collect a first set of analytic data when the web page is visited;

configuring the graphical overlay to include at least a first field, a second field, and an option to activate a selection tool;

receiving a command to activate the selection tool;

receiving a first input into the first field in response to a selection, using the selection tool, of an object within the web page under the graphical overlay, the first input identifying a user selected object being displayed in the web page below the graphical overlay;

receiving a second input into the second field, the second input indicating a type of event to detect;

using the second input to generate code configured to detect the type of event indicated by the second input;

changing the code to detect the type of event indicated by the second input with respect to the user selected object identified by the first input;

updating the script to include the changed code such that the script is configured to collect a second set of analytic data, wherein at least a portion of the second set of analytic data is different from at least a portion of the first set of analytic data; and storing the updated script in association with the web page such that the updated script is executed to collect the second set of analytic data in response to the web page being accessed after the script is updated.

2. The non-transitory computer-readable medium of claim 1, wherein the storing of the updated script comprises storing the updated script on a remote server.

3. The non-transitory computer-readable medium of claim 1, wherein the web page is displayed in a web browser, and the graphical overlay is interpreted by the web browser.

4. The non-transitory computer-readable medium of claim 1, wherein the web page is displayed in an application, and the graphical overlay is interpreted by the application.

5. The non-transitory computer-readable medium of claim 1, wherein the changed code is executed using one of JavaScript and Adobe Flash.

6. A computer-assisted method comprising:

providing a graphical overlay over a web page, the web page having a script configured to collect a first set of analytic data when the web page is visited;

configuring the graphical overlay to include at least a first field, a second field, and an option to activate a selection tool;

receiving a command to activate the selection tool;

receiving a first input into the first field in response to a selection, using the selection tool, of an object within the web page under the graphical overlay, the first input identifying a user selected object being displayed in the web page below the graphical overlay;

receiving a second input into the second field, the second input indicating a type of event to detect;

using the second input to generate code configured to detect the type of event indicated by the second input;

changing the code to detect the type of event indicated by the second input with respect to the user selected object identified by the first input;

updating the script to include the changed code such that the script is configured to collect a second set of analytic data, wherein at least a portion of the second set of analytic data is different from at least a portion of the first set of analytic data; and storing the updated script in association with the web page such that the updated script is executed to collect the second set of analytic data in response to the web page being accessed after the script is updated.

7. The method of claim 6, wherein the web page is displayed with a web browser, and the graphical overlay is an add-on to the web browser.

8. The method of claim 6, wherein the web page is displayed in an application, and the graphical overlay is an add-on to the application.

9. The method of claim 6, further comprising:

receiving the second set of analytic data from a remote server; and displaying at least a portion of the second set of analytic data in the graphical overlay based on data inputted into the graphical overlay.

10. The method of claim 6, further comprising transmitting the updated script to a server.

11. The method of claim 6, further comprising collecting, in a server, the second set of analytic data, transmitted from one or more computing devices that execute the updated script.

12. The method of claim 6, wherein the changed code detects one of: click information for the user selected object and a mouse-over for the user selected object.

13. The non-transitory computer-readable medium of claim 1, wherein the computer-executable instructions further cause the computing device to perform steps comprising:

receiving at least a portion of the second set of analytic data from a remote server; and displaying the received portion of the second set of analytic data in the graphical overlay based on data inputted into the graphical overlay, wherein the portion of the second set of analytic data displayed in the graphical overlay is updated in real time.

14. The method of claim 6, further comprising:

displaying at least a portion of the second set of analytic data corresponding to the web page in the graphical overlay;

displaying a second web page in response to a selection of an object from within the web page;

receiving at least a portion of a third set of analytic data corresponding to the second web page from a remote server; and displaying the portion of the third set of analytic data in the graphical overlay based on data inputted into the graphical overlay.

15. An apparatus comprising:

a communication interface for communicating with a remote server;

a processor; and memory storing computer-executable instructions that, when executed by the processor, cause the apparatus to:

provide a graphical overlay over a web page, the web page having a script configured to collect a first set of analytic data when the web page is visited;

configure the graphical overlay to include at least a first field, a second field, and an option to activate a selection tool;

receive a command to activate the selection tool;

receive a first input into the first field in response to a selection, using the selection tool, of an object within the web page under the graphical overlay, the first input identifying a user selected object being displayed in the web page below the graphical overlay;

receive a second input into the second field, the second input indicating a type of event to detect;

use the second input to generate code configured to detect the type of event indicated by the second input;

change the code to detect the type of event indicated by the second input with respect to the user selected object identified by the first input;

update the script to include the changed code such that the script is configured to collect a second set of analytic data, wherein at least a portion of the second set of analytic data is different from at least a portion of the first set of analytic data; and store, on the remote server using the communication interface, the updated script in association with the web page such that the updated script is executed to collect the second set of analytic data in response to the web page being accessed after the script is updated.

16. The apparatus of claim 15, wherein the communication interface is a wireless interface configured to transmit and receive signals over a cellular backhaul.

17. The apparatus of claim 15, wherein the computer-executable instructions are configured to be interpreted by at least one of: Adobe Flash, Adobe Flex, and Adobe Integrated Runtime (AIR), and configured to run on a platform comprising at least one of: iOS, Windows Mobile, Windows Phone, Android, and Blackberry OS.

18. The method of claim 6, further comprising configuring the graphical overlay to include a field having a plurality of options based on characteristics of the web page, wherein the plurality of options of the field change when the web page underneath the graphical overlay changes.

19. The method of claim 6, further comprising:
parsing the web page to detect a plurality of objects within the web page; and
importing information into the graphical overlay based on the detected plurality of objects.

20. The method of claim 6, further comprising:
displaying at least a portion of the second set of analytic data in the graphical overlay corresponding to the web page, where the portion of the second set of analytic data is filtered based on criteria specified in the graphical overlay;
displaying a second web page in response to a selection of an object from within the web page;
receiving a third set of analytic data corresponding to the second web page from a remote server; and
displaying at least a portion of the third set of analytic data in the graphical overlay, where the portion of the third set of analytic data is filtered based on the specified criteria.

21. The non-transitory computer-readable medium of claim 1, wherein the computer-executable instructions further cause the computing device to perform steps comprising:
configuring the graphical overlay to include a third field; and
receiving a third input into the third field, the third field indicating a storage location for storing analytic data,
wherein the storing of the updated script comprises storing the updated script in association with the web page such that the updated script is executed to collect the second set of analytic data and store the second set of analytic data at the storage location in response to the web page being accessed after the script is updated.

22. The method of claim 6, further comprising:
configuring the graphical overlay to include a third field; and
receiving a third input into the third field, the third field indicating a storage location for storing analytic data,
wherein the storing of the updated script comprises storing the updated script in association with the web page such that the updated script is executed to collect the second set of analytic data and store the second set of analytic data at the storage location in response to the web page being accessed after the script is updated.

23. The apparatus of claim 15, wherein the computer-executable instructions, when executed by the processor, further cause the apparatus to:
configure the graphical overlay to include a third field; and
receive a third input into the third field, the third field indicating a storage location for storing analytic data,
wherein the storing of the updated script comprises storing the updated script in association with the web page such that the updated script is executed to collect the second set of analytic data and store the second set of analytic data at the storage location in response to the web page being accessed after the script is updated.

24. The non-transitory computer-readable medium of claim 1,
wherein using the second input to generate code comprises identifying program instructions; and
wherein changing the code comprises modifying the identified program instructions based on at least the first input.

25. The non-transitory computer-readable medium of claim 1, wherein the computer-executable instructions further cause the computing device to perform steps comprising:
configuring the graphical overlay to include a third field;
receiving a third input into the third field; and
generating a rule for collecting analytic data based on the third input.

26. The non-transitory computer-readable medium of claim 25, wherein the rule comprises one of: a first rule that collects a previously visited page, a second rule that collects a load time of the web page, a third rule that collects an IP address of a visitor to the web page, and a fourth rule that collects user identification information of a viewer of the web page.

27. The method of claim 6, further comprising:
configuring the graphical overlay to include a third field;
receiving a third input into the third field; and
generating a rule for collecting analytic data based on the third input.

28. The apparatus of claim 15, wherein the computer-executable instructions, when executed by the processor, further cause the apparatus to:
configure the graphical overlay to include a third field;
receive a third input into the third field; and
generate a rule for collecting analytic data based on the third input.

* * * * *